United States Patent
Pottenger et al.

(10) Patent No.: US 11,308,384 B1
(45) Date of Patent: Apr. 19, 2022

(54) METHOD AND FRAMEWORK FOR PATTERN OF LIFE ANALYSIS

(71) Applicant: GOVERNMENT OF THE UNITED STATES AS REPRESENTED BY THE SECRETARY OF THE AIR FORCE, Rome, NY (US)

(72) Inventors: William M. Pottenger, Hellertown, PA (US); James M. Nagy, Utica, NY (US); Erik P. Blasch, Arlington, VA (US); Tuanjie Tong, Allentown, PA (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 898 days.

(21) Appl. No.: 16/121,109

(22) Filed: Sep. 4, 2018

Related U.S. Application Data (60) Provisional application No. 62/554,044, filed on Sep. 5, 2017.

(51) Int. Cl.
*G06N 3/04* (2006.01)
*G06F 17/11* (2006.01)
*G06N 7/00* (2006.01)

(52) U.S. Cl.
CPC .............. *G06N 3/04* (2013.01); *G06F 17/11* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 2015/0309962 A1* | 10/2015 | Lichman | G06Q 10/10 703/2 |
| 2016/0224899 A1* | 8/2016 | Nguyen | G06N 7/005 |
| 2016/0226901 A1* | 8/2016 | Baikalov | H04L 63/1433 |

\* cited by examiner

*Primary Examiner* — David R Vincent
(74) *Attorney, Agent, or Firm* — AFRL/RIJ; Randall P. Jones (57) ABSTRACT

In accordance with various embodiments of the disclosed subject matter, a method and framework configured for modeling a pattern of life (POL) by processing both categorical data and non-categorical data (e.g., numeric, spatial etc.), conducting pattern of life estimation (POLE), and detecting anomalous data in a multi-dimensional data set in a substantially simultaneous manner by comparing statistical PoL results.

15 Claims, 5 Drawing Sheets

METHOD AND FRAMEWORK FOR PATTERN OF LIFE ANALYSIS

CROSS-REFERENCE TO RELATED APPLICATION

This application claims the benefit of and priority to prior filed Provisional Application Ser. No. 62/554,044, filed Sep. 5, 2017, entitled METHOD AND FRAMEWORK FOR PATTERN OF LIFE ANALYSIS, which provisional patent application is incorporated herein by reference in its entirety.

GOVERNMENT INTEREST

The invention described herein may be manufactured and used by or for the Government of the United States for all governmental purposes without the payment of any royalty.

FIELD OF THE DISCLOSURE

The present disclosure relates generally to data handling systems for pattern of life (PoL) estimation from multimedia content for activity analysis and, more particularly, to a POL estimation based on multidimensional data of semantic, imagery, and numerical values and a method of design and display for normalcy modeling and anomaly detection.

BACKGROUND

Current data science applications focus on analytics from text, imagery, and numerical data for pattern classification, time-series trending, and manifold learning. These methods are data-driven, without clarification of context-defined and mission-directed focus. Activity-based intelligence techniques seek to constantly monitor streaming data from a single source to determine trends such as target tracking.

SUMMARY OF THE INVENTION

Various deficiencies in the prior art are addressed below by the disclosed systems, methods, architectures, mechanisms, apparatus, computer implemented method and/or framework configured for modeling a pattern of life and detecting anomalous data by processing both categorical data and non-categorical data (e.g., numeric, spatial etc.) of a data set in a substantially simultaneous manner.

In accordance with various embodiments of the disclosed subject matter, a method and framework configured for modeling a pattern of life (POL) by processing both categorical data and non-categorical data (e.g., numeric, spatial etc.), conducting pattern of life estimation (POLE), and detecting anomalous data in a multi-dimensional data set in a substantially simultaneous manner by comparing statistical POL results.

An embodiment according to one method comprises a computer implemented method for detecting anomalies in a dataset containing both numerical and categorical attributes, the method comprising: grouping received data according to data type and dimension to provide thereby at least one categorical data type group and at least one non-categorical data type group; assigning a dimension precision value to data within each non-categorical data type group; building, using kernel density estimation (KDE), a first statistical model using data from each non-categorical data type group in accordance with the respective assigned precision value, where the KDE is determined as a ratio of density of streaming historical data and density of measured data for each non-categorical data type group; building, using a normal distribution, a second statistical model using each categorical data type group; determining, in accordance with respective probability thresholds, anomalous data items within each of the first and second statistical models; and labeling the dataset in a manner indicative of the determined anomalous data items.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Pattern of Life (PoL) developments may be understood as developing entity-awareness through a historical analysis of dynamic data, where entities may be regions (e.g., city), sites (e.g., building), equipment (e.g. vehicles), actors (e.g., people) and so on. POL developments have been used for various physics-based sensor modalities such as Visible (EO), Infrared (IR) and Wide-Area Motion Imagery (WAMI) as well as global position system (GPS) locations. Physics-based pattern of life activities may incorporate patterning techniques such as detection, recognition, classification, identification for an entity type, sensor modality, relationship association, and event description.

Mission-directed POL requirements require a semantic interpretation of the activities, intentions, and sequences of normal behaviors. Likewise, POL techniques are used in conjunction with anomaly detection when comparing current data interpretations to the historical normalcy models. Incorporating the semantic-based textual and numerical categorical information expands on the POL modeling of entities, relationships, and events.

In accordance with various embodiments of the disclosed subject matter, a method and framework configured for modeling a pattern of life and detecting anomalous data by processing both categorical data and non-categorical data (e.g., numeric, spatial, temporal, etc.) of a data set in real-time. The pattern of life model represents the normal activity of some target under study which is represented as one or more entities, relations, events, networks, or other physical or semantic dimensions. Once modeled, anomalies are identified by surpassing defined and tunable thresholds to the model in one or more dimensions or a set of dimensions collectively. The output or result comprises the original data set with the various anomalous and normal data elements labeled.

Figure 1:
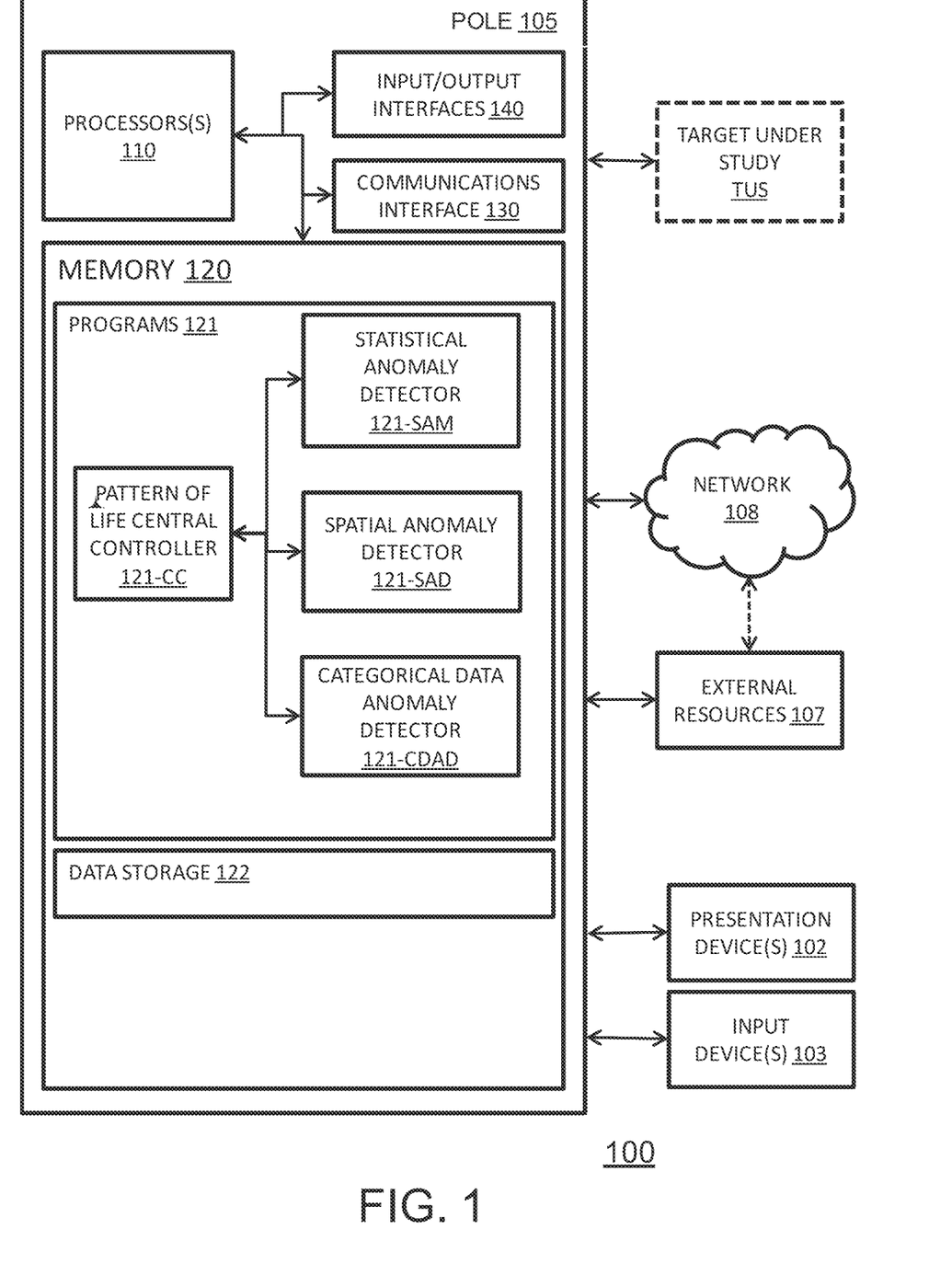
FIG. 1 depicts a high-level block diagram of an estimation system according to an embodiment.

FIG. 1 depicts a high-level block diagram of an estimation system according to an embodiment. The system 100 of FIG. 1 comprises one or more data processing elements, computing devices, network elements and the like cooperating as described herein to implement various embodiments. Not all of the described data processing elements, computing devices, network elements and the like are necessary to implement each embodiment. The exemplary system 100 described herein is provided for illustrative purposes only.

The system 100 of FIG. 1 contemplates a server, workstation or other computing device implementing a Pattern of Life Estimator Machine (POLE) 105 operating in accordance to the various embodiments, such as described herein and with respect to the various other figures. Specifically, the estimation system 100 of FIG. 1 is configured to provide a POL estimation based on statistical, spatial, or categorical data and comparisons for anomaly detection.

In various embodiments, the POLE 105 is configured to receive various data sets or portions thereof associated with a target under study (TUS), process the data sets in accordance with the various methodologies described herein, and estimate various patterns of life (PoL) and other characteristics associated with the TUS. It is noted that the target under study may simply comprise a multidimensional data set associated with, or descriptive of, a thing or situation or statistical occurrence of interest.

As shown in FIG. 1, the POLE machine 105 is configured in a particular manner in terms of hardware, software, input/output resources, connected devices/functions and the like. However, it will be appreciated by those skilled in the art that the POLE 105 may be configured according to any one of a number of computing topologies or configurations. That is, the POLE 105 may comprise a general purpose computer, a special purpose computer, a specific type of server and/or any other computing device capable of performing the various functions described herein. Thus, the POLE 105 as described herein with respect to FIG. 1 may also be implemented as a general purpose computing device.

As depicted in FIG. 1, the POLE 105 includes one or more processors 110, a memory 120, a communications interface 130 and an input/output (I/O) interface 140. The processor 110 is coupled to each of memory 120, communication interface 130, and I/O interface 140.

The processor 110 is configured for controlling the operation of POLE 105, including operations supporting the methodologies described herein with respect to the various figures, as well as any interactions with external resources 107 such as compute resources, storage resources, network resources, communications resources and the like, were such interactions may be direct or via a network 108 depending upon configuration of the embodiment.

The memory 120 is configured for storing information suitable for use in identifying anomalies within a dataset (e.g., such as provided by a TUS) according to the various embodiments. Specifically, memory 120 may store programs 121, data 122 and so on. Within the context of the various embodiments, the programs 121 and data 122 may vary depending upon the specific functions implemented by the POLE 105. For example, as depicted in FIG. 1, the programs portion 121 of memory 120 includes functional modules denoted as follows: a pattern of life central controller 121-CC, a statistical anomaly detector 121-SAM, a spatial anomaly detector 121-SAD and a categorical data anomaly detector 121-CDAD. Other configurations beyond those depicted herein are also contemplated by the inventors.

The pattern of life central controller 121-CC provides a mechanism to manage the data processing and other steps associated with the various methods described herein with respect to the figures, such as invoking the appropriate anomaly detector for handling a current data type, illustratively numeric data, spatial data, categorical data and/or other types of data. In the illustrative embodiment, three types of data are processed by respective anomaly detectors under the control of the central controller 121-CC. Specifically, the statistical anomaly detector 121-SAM provides a mechanism to receive and process numeric data associated with the TUS, the spatial anomaly detector 121-SAD provides a mechanism to receive and process spatial data associated with the TUS, and the categorical data anomaly detector 121-CDAD provides a mechanism to receive and process categorical data associated with the TUS. The various functions will be described in more detail below.

Generally speaking, the memory 120 may store any information suitable for use by the POLE 105 in implementing one or more of the various methodologies or mechanisms described herein. It will be noted that while various functions are associated with specific programs or databases, there is no requirement that such functions be associated in the specific manner. Thus, any implementations achieving the functions of the various embodiments may be used.

The communications interfaces 130 may include one or more services signaling interfaces such as a Wi-Fi or WiMAX interface, a 3G broadband cellular network wireless interface, a 4G broadband cellular network wireless interface, an Ethernet interface and the like for supporting data/services signaling between POLE 105 and the network 108. It will be appreciated that fewer or more, as well as different, communications interfaces may be supported. The various communications interfaces 130 are adapted to facilitate the transfer of files, data structures, messages, requests and the like between various entities in accordance with the embodiments discussed herein.

The I/O interface 140 may be coupled to one or more presentation devices (PDs) 102 such as associated with display devices for presenting information to a user, one or more input devices (IDs) 103 such as computer display, touch screen or keypad input devices for enabling user input, and/or interfaces enabling communication between the POLE 105 and other computing, networking, presentation or input/output devices (not shown).

Presentation devices 102 may include a display screen, a projector, a printer, one or more speakers, and the like, which may be used for displaying data, displaying video, playing audio, and the like, as well as various combinations thereof. The typical presentation interfaces associated with user devices, including the design and operation of such interfaces, will be understood by one skilled in the art. In various embodiments, the presentation devices 102 used to display information pertaining to the various methodologies. In various embodiments, the presentation devices are not utilized; rather, output/presentation information pertaining to the various methodologies is transmitted to a remote server or other external resource 107.

Input devices 103 may include any user control devices suitable for use in enabling a local or remote user of the POLE 105 to interact with the POLE 105. For example, the input devices 103 may include touch screen based user controls, stylus-based user controls, a keyboard and/or mouse, voice-based user controls, and the like, as well as various combinations thereof. The typical user control interfaces of user devices, including the design and operation of such interfaces, will be understood by one skilled in the art. In various embodiments, the input devices 103 are not utilized; rather, input/control information pertaining to the various methodologies is received from a remote server or other external resource 107.

Although primarily depicted and described as having specific types and arrangements of components, it will be appreciated that any other suitable types and/or arrangements of components may be used for POLE 105.

It will be appreciated that the functions depicted and described herein may be implemented in software and/or hardware, e.g., using a general purpose computer, one or more application specific integrated circuits (ASIC), and/or any other hardware equivalents. In one embodiment, the various programs depicted as loaded within memory 120 are executed by the processor(s) 110 to implement their respective functions. It will also be appreciated that the various programs may be stored on a computer readable storage medium prior to being loaded into memory 120; such computer readable storage media comprising semiconductor memory devices, magnetic media, optical media, electromagnetic media and the like. Generally speaking, any form of tangible computer memory may be used to store computer instructions which, when executed by the processor 110, operate to perform the various methods and functions described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, transmitted via a data stream in a broadcast or other tangible signal-bearing medium, and/or stored within a memory within a computing device operating according to the instructions.

The Pattern of life central controller 120 manages the data process such as the pattern of life labeling method depicted below with respect to FIG. 2. The Pattern of life central controller 120 invokes the anomaly detector designed to handle the current data type, namely numeric data is sent to the Statistical anomaly detector 110, spatial data is sent to the Spatial anomaly detector 115 and categorical data to the Categorical data anomaly detector 125.

Figure 2:
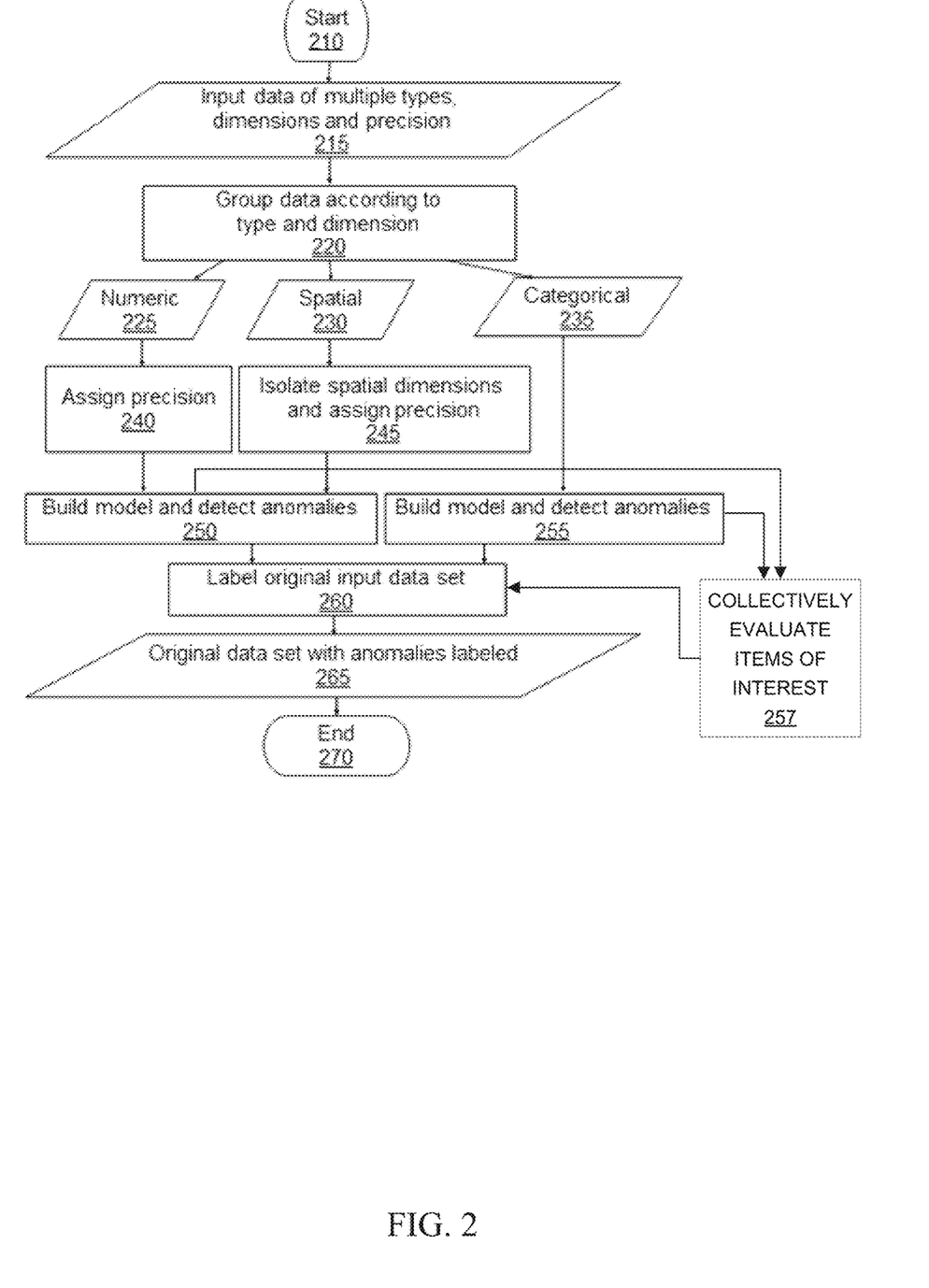
FIG. 2 depicts a flow diagram of a pattern of life labeling method according to an embodiment.

FIG. 2 depicts a flow diagram of a method according to an embodiment. Specifically, FIG. 2 depicts a pattern of life labeling method 200 suitable for use in the system 100 of FIG. 1 and configured to generate a data set associated with a TUS including various labels associated with detected anomalies.

The method 200 starts at step 210 and proceeds to step 215, where input data of multiple types, dimensions and precision is received. Received input data may comprise multiple data types and/or multiple dimensions (i.e., multiple attributes or fields). The particular data types and/or dimensions depend upon the particular type of target under study. For example, location data is appropriate for targets in motion but unnecessary for stationary target. Received input data may be static (unchanging) or dynamic (changing over time).

The received input data may be relevant to a specified "Item of Interest," which comprises an Attribute-Value pair that specifies the data to be modeled. An Item of Interest may specify a full Item (including both Attribute and Value), an Attribute (i.e., an Item with an empty Value), or a Value (i.e., an Item with an empty Attribute), thereby requiring all modeled data to include the specified Item (i.e., Attribute-Value pair), Attribute (with any or no associated Value) or Value (with any or no associated Attribute), respectively. One or more Items of Interest may be applied simultaneously.

At step 220, the received data is grouped according to type and dimension. The estimation system then Group[s] data according to type and dimension 220. In the illustrative embodiment, the received input data is grouped into the types of Numeric (decimal numbers) 225, Spatial (geospatial coordinates) 230 and Categorical (sets of semantic labels) 235, per dimension as well as additional types Ordinal (sets of enumerated values). It is noted that 'Temporal' data, defined as data pertaining to time, is a subset of the Numeric type because Temporal representations are processed in a manner similar to that of other Numeric 325 representations, and further including the application of additional heuristics that are relevant to temporal semantics (e.g., patterns of life over 'minutes', 'hours', 'days', 'weeks' and 'years').

At step 240, each numeric dimension within the numeric group 225 is assigned a precision value (e.g., tenths, hundredths).

At step 245, each dimension within the spatial group is isolated in accordance with respective coordinate systems/axes and the like, and then assigned a precision value (e.g., defining a distance within which to spatial points are considered the same such as 50 yards, 100 yards and the like).

At step 250, the numeric data 225 (at the assigned precision value) and the spatial data (at the assigned precision value) is used to build a first statistical model of the TUS and to detect anomalies within the first statistical model and/or data describing the TUS.

At step 255, the categorical data 235 is used to build a second statistical model of the TUS and to detect anomalies within the second testable model and/or data describing the TUS.

Specifically, once the first and second statistical models are built (250, 255), the dimensions are applied to determine which items generate pattern of life/anomaly detection (POL/AD) for each evaluated dimension and type.

At step 260, the anomalous dimension-item sets are used to label the original input data set elements associated with the TUS as either normal or anomalous to provide thereby an output or result comprising the original data set with the various anomalies labeled/identified. Further, input records may be labeled "normal" if (a) no anomalous items of interest were discovered, and (b) the collection of items of interest in a given record were not found to be anomalous.

In various embodiments, at step 257 a portion of (or all) items of interest chosen for POL/AD analysis are collectively (jointly) evaluated to see if the collection of items of interest (i.e., the record containing the items of interest) is anomalous. Thus a record can be anomalous even if none of the items of interest are anomalous.

The statistical models 250 used for Numeric 225 and Spatial 230 dimensions may be a different kind than the statistical models 255 used for Categorical 235 dimensions. In one embodiment, kernel density estimation (KDE) is used for the Numeric 225 and Spatial 230 statistical model 250. The first kernel density is determined between values of the data $f_d^0$ and $f_d^1$, where the superscripts 0 and 1 indicate streaming historical and measured data respectively and the subscripts d indicate the density. An estimate of the kernel density is given by equation 1 as follows:

$$\hat{f}_h(x) = \frac{1}{n}\sum_{i=1}^{n} K_h(x - x_i) = \frac{1}{nh}\sum_{i=1}^{n} K\left(\frac{x - x_i}{h}\right) \quad \text{(eq. 1)}$$

where each kernel is a standard normal distribution, and h is an adaptive bandwidth (varies based on local density), its initial/overall value is calculated using equation 2, as follows:

$$h = \left(\frac{4\hat{\sigma}^5}{3n}\right) \approx 1.06\hat{\sigma}n^{-\frac{1}{5}} \quad \text{(eq. 2)}$$

As shown above in equation 1, the kernel density may be modeled as a function of the ratio of the density of the bandwidth of the data obtained from the data types. The rationale is provided below.

53 n≈1.06 σn−15 (eq. 2), where h is estimated with the standard deviation of the observed data. The local bandwidth (hl) is calculated as follows:

$$h_l = \left(\frac{h_d}{d_l}\right) \quad \text{(eq. 3)}$$

where d is the overall density (number of kernels/data range), and $d_l$ is the local density. The higher the local density, the smaller the local bandwidth will be.

Figure 3:
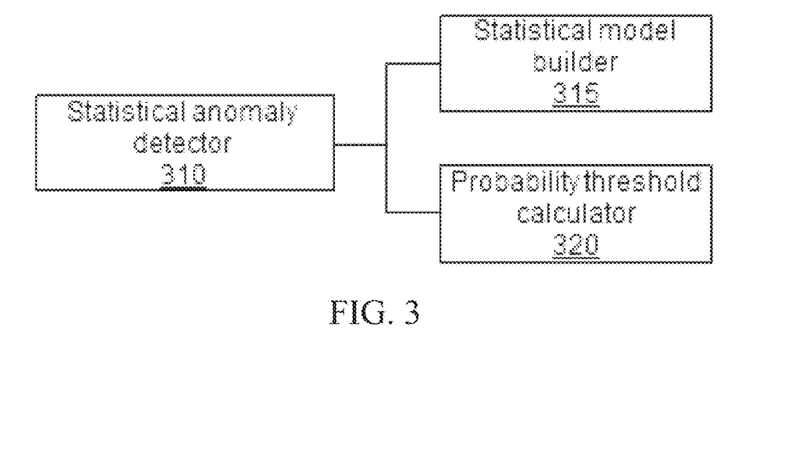
FIG. 3 is a block diagram of high-level logical elements for an anomaly detector according to an embodiment and suitable for use in the embodiments of FIGS. 1-2.

FIG. 3 depicts a block diagram of an embodiment of high-level logical elements for an anomaly detector such as described above with respect to FIGS. 1-2, such as may be implemented as programs 121 within the memory 120 of the POLE 105 of FIG. 1. Specifically, a statistical anomaly detector 310 manages the anomaly detection process in which a statistical model builder 315 generates a statistical model from a provided data set, and a probability threshold calculator 320 defines whether more or fewer anomalies are desired in an output (e.g., output data set 265), thereby tuning the model builder 315 to this end. The anomaly detector 310 illustratively uses the statistical model generated by the model builder 315 to determine which items in the data are anomalous.

Figure 4:
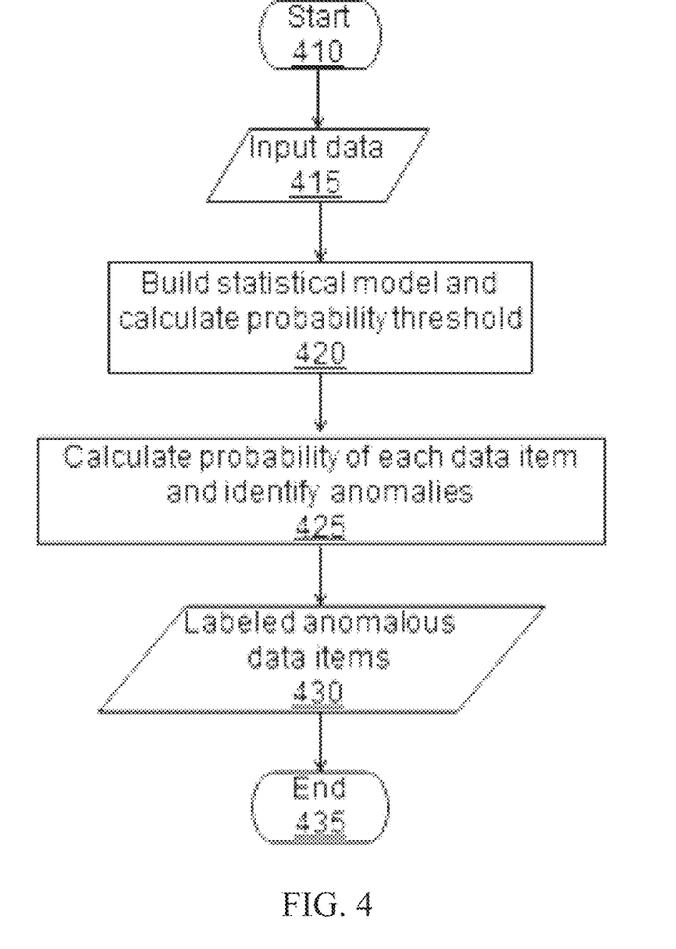
FIG. 4 depicts an anomaly labeling method suitable for use in the embodiments of FIGS. 1-2.

FIG. 4 depicts a flow diagram of a method according to an embodiment. Specifically, FIG. 4 depicts an anomaly labeling method 400 suitable for use in the method 200 of FIG. 2 and configured to generate labeled anomalous data items.

The method 400 starts at step 410 and proceeds to step 415, where input data is received and used to build a statistical model (e.g., first or second statistical model such as described above with respect to FIG. 2) and to calculate a probability threshold. The statistical model is then applied to each item from the received input data to compare, evaluate, and identify anomalous data items. At step 430, identified anomalous data items are labeled accordingly and the method 400 exits at step 435.

Figure 5:
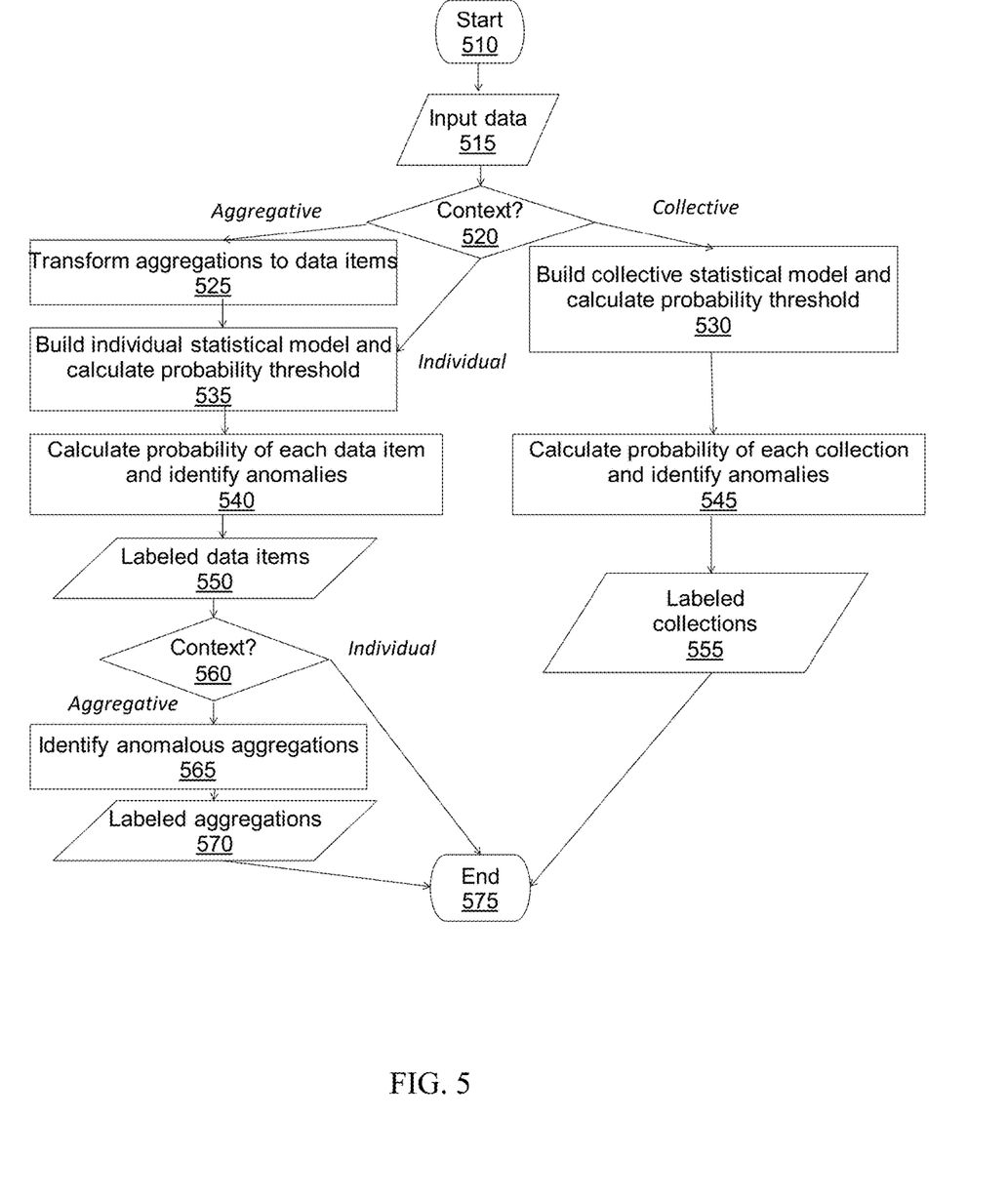
FIG. 5 depicts a flow diagram of a pattern of life labeling method according to an embodiment.

FIG. 5 depicts a flow diagram of an anomaly labeling method according to an embodiment. Specifically, FIG. 5 depicts a pattern of life labeling method 500 suitable for use in the system 100 of FIG. 1 and configured to generate a data set associated with a TUS including various labels associated with detected anomalies.

The method 500 starts at step 510 and proceeds to step 515, where input data of multiple types, dimensions and precision is received. The received input data 515 may contain zero or more Items, zero or more Groups and zero or more Networks. An "Item" is an Attribute-Value pair of data. An "Attribute" is a textual label describing the semantic of the associated Value. A "Value" is the datum associated with the Attribute. A "Single-Valued Attribute" is an Attribute that is associated with one Value. A "Multi-Valued Attribute" is an Attribute that is associated with more than one Value. An Attribute is "empty" if the label contains zero textual characters. A Value is "empty" if it represents no data. For the purposes of FIGS. 2 and 5, Values may represent Numeric 225 (including Temporal), Spatial, 230 or Categorical 235 data types.

A "Group" is a collection of zero-or-more Groups and zero-or-more Items. A Group is "empty" if it contains zero Groups and zero Items. A Group cannot contain itself, neither directly nor as a contained Group element.

A "Network" contains one Group of Nodes, one Group of Edges and one Group of Metadata. A "Node" is itself a Group and represents an object within the Network. An "Edge" is itself a Group and represents a connection between Nodes. "Metadata" is itself a Group and represents additional information about the Network beyond that captured in the Nodes and Edges.

Networks are capable of representing a range of information complexity. For the purposes of this paragraph, "complexity" is defined in terms of the number and types of data contained in each Node, Edge or Metadata, as opposed to the number of Nodes, Edges or Metadata elements contained (i.e., "scale"). More complex Networks commonly require additional transformations to be represented in Numeric 325, Spatial 330 and/or Categorial 335 form. For example, consider an embodiment utilizing a Network representing the social connections between people. In this Network: Nodes represent people and contain one Item (a unique identifier); and Edges contain two Items (the identifiers of the two connected people). All identifiers are Categorical 335 Values and can be utilized directly. Consider an embodiment using the same Network with the Edges now containing an additional textual semantic Item (the type of relationship between the people, e.g., "father", "child", "employee"). These relationship Items must be processed (for example, using information extraction techniques) to transform them into Categorical 335 form before being used as an Item of Interest in the data transformation process.

Networks may also incorporate information acquired through the application of Higher Order Learning techniques. For example, consider an embodiment applied to a Network whereby Nodes represent people and contain two Items (a unique identifier and second-order path count); and Edges contain two Items (the identifiers of the two connected people). The second-order path count is determined by applying Higher Order Learning techniques to each Node in the Network and generating the systems of distinct representatives (SDRs) therein. These second-order path counts, a Numeric 325 data type, can then be used as an Item of Interest to determine, for example, what people are anomalies in how dramatically their social network changes.

At step 520, a determination is made as to the context within which the input data 115 will be processed. Input data 515 may be processed for pattern of life anomalies in Individual, Aggregative or Collective contexts. Input data is deemed anomalous in the Individual context if the probability of the Item falls outside the probability threshold of the statistical model. Input data is deemed anomalous in the Aggregate context if the probability of at least one Item within the collection is deemed anomalous. Input data is deemed anomalous in the Collective context if the probability of the collection is jointly deemed anomalous. It is possible for Input data to be deemed anomalous in the Collective context while Normal in the Aggregate context, and vice versa. Table 1 depicts exemplary pattern of life contexts for given data types, where "X" represents viable contexts.

TABLE 1

|  | Individual | Aggregative | Collective |
|---|---|---|---|
| Items | X | — | — |
| Sets | — | X | X |
| Networks | — | X | X |

At step 535, input data 515 to be processed in the Individual context is used to build an individual statistical model and calculate a probability threshold.

At step 525, input data 515 to be processed in the Aggregative context (e.g., an embodiment accepting narrative text as input), unstructured textual fields are first processed by information extraction techniques to identify Numeric 225 (including Temporal), Spatial 230 and Categorical 235 values used to generate the individual (aggregated data) statistical model(s) at step 535.

At step 540, the statistical model generated at step 535 is applied to each Item from the input data 515 to Calculate the probability of each data Item and identify anomalies. This results in Labeled data items 550, wherein the data items are labeled as normal or anomalous.

At step 560, a determination is made as to the context within which the input data is being processed. If the input data 515 is being processed in the Aggregative context, then the aggregations are transformed to data items as previously described with respect to step 525 And processed in accordance with the individual context to produce labeled data items 550, wherein the data items are labeled as normal or anomalous. Normal and anomalous aggregations therein are identified. This results in labeled data item aggregations 570, wherein the data aggregations are labeled as normal or anomalous.

At step 530, input data 515 to be processed in the Collective context is used to Build a collective statistical model and calculate a probability threshold. At step 545, the statistical model is then applied to each collection from the input data 515 to Calculate the probability of each collection and identify anomalies 545. This results in Labeled anomalous collections 555, wherein the data collections are labeled as normal or anomalous.

Various embodiments associated with the methods 200-500 described above exhibit improved performance by using one or both of the following tuning techniques:

(1) Reducing the number of kernels used by allowing a user (e.g., a domain expert) to set a precision of the input data. As an example, for input data 11, 12, 13, if the precision is set to one (1) (a default setting), three kernels will be built, whereas if the precision is set to TEN (10), then only one kernel is needed and a weight OF three (3) is assigned to it.

(2) Limiting the number of kernels used for calculating the probability of a given number such as by checking a maximum probability of the given number in terms of unused kernels.

The POL applied to categorical data such as at step 255 is provided as follows: (1) Count the occurrences of each categorical value (e.g., people, vehicles, and boats); (2) Treat the counts as a normal distribution with the count of the most frequent value used as the mean; and (3) The categories whose counts fall into the tail (e.g., 10%, 20%, 4 or 5 standard deviations, or some other configurable amount) will be considered anomalous categories.

Table 2 depicts a comparison analysis of various POL methods applied to categorical (e.g., medical) data using standard methods from a first data set denoted as Lym (Lymphography data set, 148 records, 18 categorical attributes, 6 outliers/anomalies) depicted in the first row, and a second data set denoted as BC (Breast Cancer data set, 483 records, 9 categorical attributes, 39 outliers/anomalies) depicted in the second (bottom) row, where the tabulated data comprises the minimum number of outputs (fewer is better) containing all outliers/anomalies for each of the two data sets as processed by each of six methodologies. In particular, Table 2 depicts the results of processing the two datasets in accordance with the embodiments described herein (first column), actual outliers/anomalies (second column), an entropy-based local search algorithm (LSA—third column), a frequent pattern-based outlier factor algorithm (FPOF—fourth column), a cluster-based local outlier factor algorithm (CBLOF—fifth column), a k-nearest-neighbor based algorithm (KNN—sixth column), and a recurrent neural network-based algorithm (RNN—Seventh column). It can be seen by inspection that the various embodiments/inventions described herein (POLE) provided herein provide superior performance to each of the other techniques depicted in Table 2.

TABLE 2

Outlier/Anomaly results from categorical data

|  | ACTUAL | POLE | LSA | FindFPOF | FindCBLOF | KNN | RNN |
|---|---|---|---|---|---|---|---|
| Lym | 6 | 6 | 7 | 16 | 30 | 15 | N/A |
| BC | 39 | 54 | 56 | 56 | 64 | 112 | 56 |

The various embodiments described herein provide improved processing of multidimensional data versus existing POL techniques. The various embodiments contemplate that for each data instance with multiple attributes, as long as the value of one attribute is an anomaly in the context of all instances, then the instance is an outlier/anomaly. For example, given a data set of weapons used in violent incidents, if over 100 violent incidents the weapons (an attribute) used are "handgun" in 98 incidents, and "sword" in two incidents, then these two incidents are anomalous due to the unusual (rare) weapon used.

Within the context of the various embodiments, to detect outliers/anomalies of multidimensional (multi-attribute) data, each attribute is processed as described herein, and the record/instance is reported as an outlier/anomaly as long as the value of at least one attribute is anomalous. The various embodiments may be applied to data with mixed numerical and categorical attributes. Further, the resulting output information may be sorted based on overall (average) probability estimated by values of all attributes used for detection.

In various embodiments, a user of the system 100 may choose to find anomalies based on overall similarities among instances/records, in addition to the anomalies determined by individual attribute values. In this manner, various embodiments identify a record/instance as anomalous even if no single attribute of the record/instance is itself anomalous. In various embodiments, such as for a user that is a domain expert having particular knowledge of the data set to be studied, the user may choose which attributes should be used for anomaly detection. In this manner, improved results may be achieved since potential statistical noise may be effectively removed or reduced before executing the methods of the various embodiments.

Table 3 depicts experimental results achieved by processing numerical data of four real world numerical data sets and compared with other five outlier detection. The data sets include (first row) HTTP, http service data with network attacks as outliers, subset of the KDDCUP99 http data set, (second row) Forest, data of forest cover type, original data is for multiclass classification; instances from class 2 considered normal, 4 considered outliers; (third row) Shuttle, data of shuttle space conditions (with some measures), original data is for multiclass classification; instances for from class 1 considered normal, others (class 4 discarded) considered outliers, and (fourth row) SMTP, smtp service data with network attacks as outliers, subset of the KDD-CUP99 SMTP data set.

TABLE 3

Outlier/Anomaly results from numerical data

| Name | Size | Number of attributes | Number of outliers/anomalies |
|---|---|---|---|
| HTTP | 567497 | 3 | 2211 (0.4%) |
| Forest | 286048 | 10 | 2747 (0.9%) |
| Shuttle | 49097 | 9 | 3511 (7%) |
| SMTP | 95156 | 3 | 30 (0.03%) |

Table 4 presents a comparison of six techniques as applied to the processing of the data set depicted above with respect to Table 3. In particular, the four data sets are depicted in the same four rows as per Table 3, which data sets are depicted within Table 4 as having been processed in accordance with the embodiments described herein (first column), a mass estimation based algorithm (MassAD, second column), a (tree) model based algorithm (iForest, third column), a distance based algorithm (ORCA, fourth column), a density-based local outlier factor algorithm (LOF, fifth column) and a 1-the class support vector machine based algorithm using Radial Basis Function kernel (1-SVM, sixth column). In particular, Table 4 shows the values of area under the curve (AUC, greater is better) of the results of the six techniques on four data sets (result of LOF on HTTP is missing due to an excessive runtime—it did not finish although given two weeks).

TABLE 4

Area Under the Curve Outlier/Anomaly results from numerical data

|  | POLE | MassAD | iForest | ORCA | LOF | 1-SVM |
|---|---|---|---|---|---|---|
| HTTP | 1.00 | 1.00 | 1.00 | 0.36 | N/A | 0.90 |
| Forest | 0.94 | 0.91 | 0.87 | 0.83 | 0.57 | 0.90 |
| Shuttle | 0.99 | 0.99 | 1.00 | 0.60 | 0.55 | 0.79 |
| SMTP | 0.96 | 0.86 | 0.87 | 0.87 | 0.32 | 0.78 |

Figure 6:
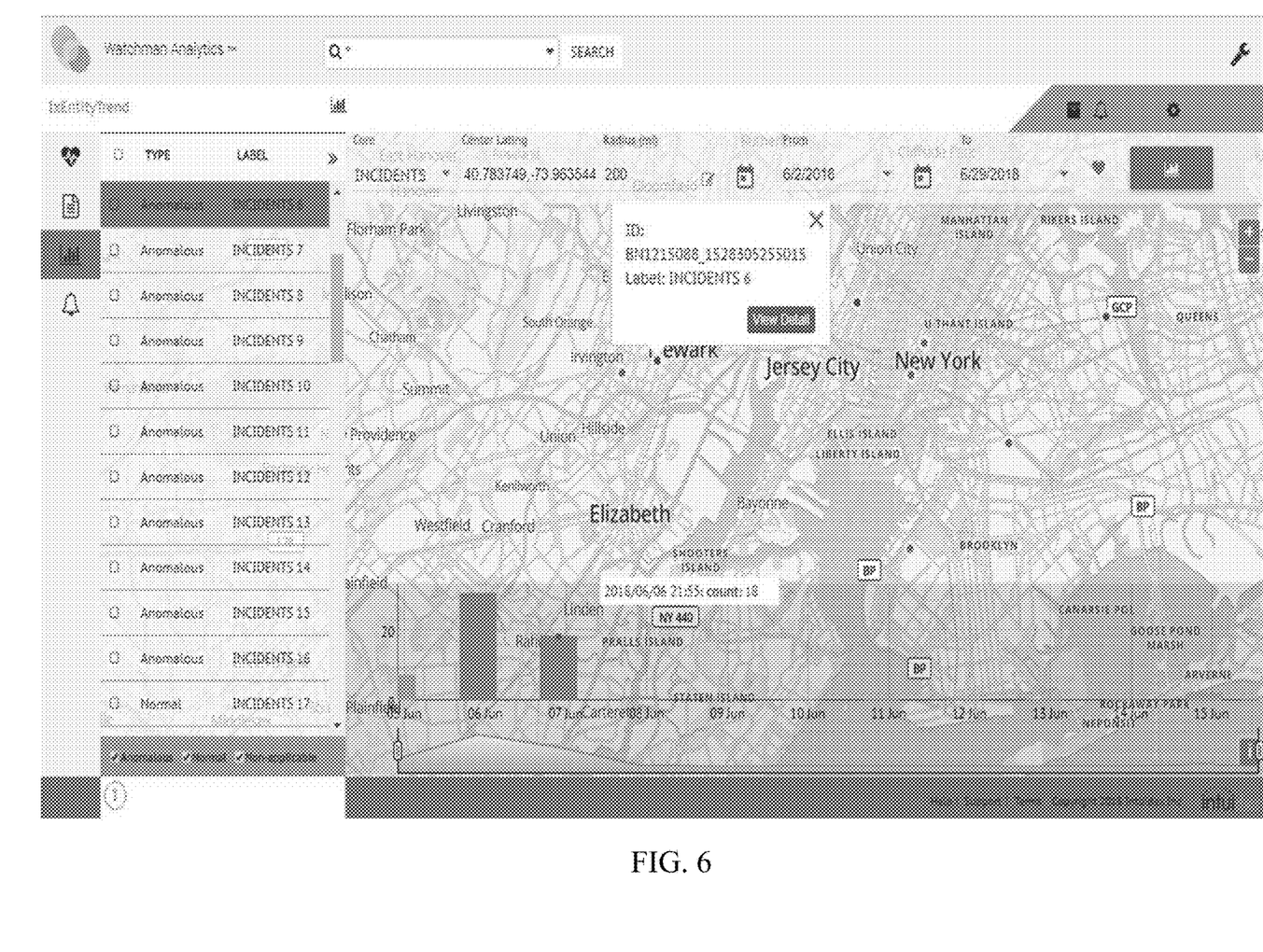
FIG. 6 depicts an exemplary user defined operating picture (UDOP) suitable for communicating situational awareness, pattern of life and anomalous data information to a user.

It is noted that the time complexity can be determined for numerical data as shown in Table 3, Table 4, and FIG. 6. If d is number of mass distributions, t is the number of trees (100 was used), $\psi$ is the sampling size, h is the level of mass distribution estimation, n is data size, m is the number of attributes, k is the number of kernels, x is the number of raw outputs before sorting, then the order of complexity may be respectively determined per equations 4-9, as follows:

$$\text{Invention: } O(nm \log k + x \log x) \quad \text{(eq. 4)}$$

$$\text{MassAD: } O(d(\Psi^{h+1}+n)) \quad \text{(eq. 5)}$$

$$\text{iForest: } O(t(\Psi+n)\log(\Psi)) \quad \text{(eq. 6)}$$

$$\text{ORCA: } O(mn \log(n)) \quad \text{(eq. 7)}$$

$$\text{1-SVM: } O(n^2 m) \quad \text{(eq. 8)}$$

$$\text{LOF: } O(n^2 m) \quad \text{(eq. 9)}$$

When the anomaly probability threshold (of each attribute) is set to 1/(2*range) (default when the user does not select the number of anomalous records output), 100%, 100%, 97%, and 73% of all the anomalies of the HTTP, Forest, Shuttle, and STMP data sets, respectively, are detected.

These methods confirm that the threshold setting is reasonable. In other words, the default threshold could be used in the situation where the user is provided a quick recommendation without requiring the user to select the number of anomalous records output. (In essence, the threshold is based on the probability of events assuming a uniform distribution. If the calculated probability of a given event is less than half that based on the assumption of a uniform distribution, it is considered anomalous.)

Various embodiments provide an output presentation which graphically depicts (renders) the results in a user defined operating picture (UDOP), such as (per FIG. 5) a spatial POL depicted on a terrain map wherein numeric and timing information may be presented as a bar graph while semantic information may be displayed over time as is the categorical labeling of the statistical data.

Various embodiments contemplate rendering identified/determined anomalous data in an accumulated manner such that a trending of such data is apparent to the viewer of such a presentation. Various embodiments contemplate the presentation of anomalous data labeled datasets via numerical graphs, spatial overlays, semantic listings and/or other rendering methods. Various embodiments contemplate the export or delivery or transmission of anomalous data labeled datasets to local or remote processing entities for further processing and statistical analysis such as to examine trends, clusters and/or other data-related artifacts associated with the timing, position, type or other parameter associated with the determined/identified anomalous data items in the categorical and/or non-categorical datasets or portions thereof.

Various embodiments provide a pattern of life assessment system using Kernel density estimation (KDE) which relate assessment to an data type, semantic labels, and probabilistic modeling; performing, tuning based on the data bandwidth; performing, predicting of anomaly detection based on measured data compared to the pattern of life assessment over entities. These methods embody a POL user definer operating picture (UDOP) method to determine and present the entities, relationships, and events over space, time, and categorical descriptions. Various embodiments provide a data fusion, pattern of life, and visual system assessment comprising a main module including a multidimensional data analytics estimation system to afford a categorical entity activity analysis over historical information. Various embodiments provide a method to combine multi-modal data (e.g., user-defined semantic and physics-based sensing) of entity activities. Various embodiments provide a method to incorporate other estimation methods (e.g., graph-based) to model the behavioral of semantic trends. Various embodiments provide a method to predict normalcy for anomaly detection.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A computer implemented method for the detection and viewer ascertainable presentation of anomaly trends in a dataset containing both numerical and categorical attributes, the method comprising:
    grouping received data according to data type and dimension to provide thereby at least one categorical data type group and at least one non-categorical data type group;
    assigning a dimension precision value to data within each non-categorical data type group;
    building, using kernel density estimation (KDE), a first statistical model using data from each non-categorical data type group in accordance with the respective assigned precision value, where the KDE is determined as a ratio of density of streaming historical data and density of measured data for each non-categorical data type group;
    building, using a normal distribution, a second statistical model using each categorical data type group;
    determining, in accordance with respective probability thresholds, anomalous data items within each of the first and second statistical models;
    labeling the dataset in a manner indicative of the determined anomalous data items; and
    presenting said labeled dataset so as to depict said anomaly trends in a manner ascertainable by presentation to a viewer by any one of numerical graphs, spatial overlays, or semantic listings.

2. The method of claim 1, wherein said anomalous data provides a pattern of life (POL) indication, and said method further comprises tuning each KDE in accordance with historical POL information associated with the type of data being processed.

3. The method of claim 1, wherein a probability threshold is based upon a uniform distribution, and a probability of an event less than 0.5 is indicative of the event being anomalous.

4. The method of claim 1, further comprising reducing a number of kernels used for said KDE in response to an input signal indicative of a lower precision value.

5. The method of claim 1, further comprising reducing a number of kernels used for calculating the probability of a given number in response to determining a maximum probability of the given number in terms of unused kernels.

6. The method of claim 1, wherein a POL applied to categorical data is provided by counting the occurrences of each categorical value, treating the counts as a normal distribution with the count of the most frequent value used as the mean, and determining as anomalous those categories having counts falling within a predefined tail portion of the distribution curve.

7. The method of claim 1, wherein:
    the kernel density is determined between values of the data $d_d^0$ and $f_d^1$, where the superscripts 0 and 1 indicate streaming historical and measured data respectively and the subscripts d indicate the density; and
    an estimate of the kernel density is given by the following equation:

$$\hat{f}_h(x) = \frac{1}{n}\sum_{i=1}^{n} K_h(x - x_i) = \frac{1}{nh}\sum_{i=1}^{n} K\left(\frac{x - x_i}{h}\right)$$

wherein each kernel is a standard normal distribution, and h is an adaptive bandwidth.

8. The method of claim 7, wherein an initial/overall value of adaptive bandwidth h is given by the following equation:

$$h = \left(\frac{4\hat{\sigma}^5}{3n}\right) \approx 1.06\hat{\sigma}n^{-\frac{1}{5}}.$$

9. The method of claim 1, further comprising:
extracting, from unstructured text fields within said dataset, any numeric, spatial and categorical data selected for aggregative processing;
grouping extracted data according to data type and dimension to provide thereby at least one categorical data type group and at least one non-categorical data type group;
assigning a dimension precision value to data within each non-categorical data type group;
building, using kernel density estimation (KDE), an aggregative statistical model using said extracted data;
determining, in accordance with respective probability thresholds, anomalous data items within the group of extracted data to identify thereby anomalous aggregations; and
labeling the dataset in a manner indicative of the determined anomalous data aggregations.

10. The method of claim 1, further comprising:
building, using kernel density estimation (KDE), a collective statistical model using a collection of data items from said dataset;
determining, in accordance with respective probability thresholds, anomalous data items within the collection of data items to identify thereby anomalous collections; and
labeling the dataset in a manner indicative of the determined anomalous data collections.

11. An apparatus for the detection and viewer ascertainable presentation of anomaly trends in a dataset containing both numerical and categorical attributes, the apparatus comprising a processor configured for:
grouping received data according to data type and dimension to provide thereby at least one categorical data type group and at least one non-categorical data type group;
assigning a dimension precision value to data within each non-categorical data type group;
building, using kernel density estimation (KDE), a first statistical model using data from each non-categorical data type group in accordance with the respective assigned precision value, where the KDE is determined as a ratio of density of streaming historical data and density of measured data for each non-categorical data type group;
building, using a normal distribution, a second statistical model using each categorical data type group;
determining, in accordance with respective probability thresholds, anomalous data items within each of the first and second statistical models;
labeling the dataset in a manner indicative of the determined anomalous data items; and
presenting said labeled dataset so as to depict said anomaly trends in a manner ascertainable by presentation to a viewer by any one of numerical graphs, spatial overlays, or semantic listings.

12. A tangible and non-transient computer readable storage medium storing instructions which, when executed by a computer, adapt the operation of the computer to provide a method for the detection and viewer ascertainable presentation of anomaly trends in a dataset, comprising said stored instruction steps for:
grouping received data according to data type and dimension to provide thereby at least one categorical data type group and at least one non-categorical data type group;
assigning a dimension precision value to data within each non-categorical data type group;
building, using kernel density estimation (KDE), a first statistical model using data from each non-categorical data type group in accordance with the respective assigned precision value, where the KDE is determined as a ratio of density of streaming historical data and density of measured data for each non-categorical data type group;
building, using a normal distribution, a second statistical model using each categorical data type group;
determining, in accordance with respective probability thresholds, anomalous data items within each of the first and second statistical models; and
labeling the dataset in a manner indicative of the determined anomalous data items; and
presenting said labeled dataset so as to depict said anomaly trends in a manner ascertainable by presentation to a viewer by any one of numerical graphs, spatial overlays, or semantic listings.

13. The method of claim 1, wherein the distribution used to build the second statistical model comprises a KDE determined as a ratio of the density of streaming historical data and density of measured data for each categorical data type group.

14. The apparatus of claim 11, wherein the distribution used to build the second statistical model comprises a KDE determined as a ratio of the density of streaming historical data and density of measured data for each categorical data type group.

15. The computer readable storage medium of claim 12, wherein the distribution used to build the second statistical model comprises a KDE determined as a ratio of the density of streaming historical data and density of measured data for each categorical data type group.

* * * * *